UNITED STATES PATENT OFFICE.

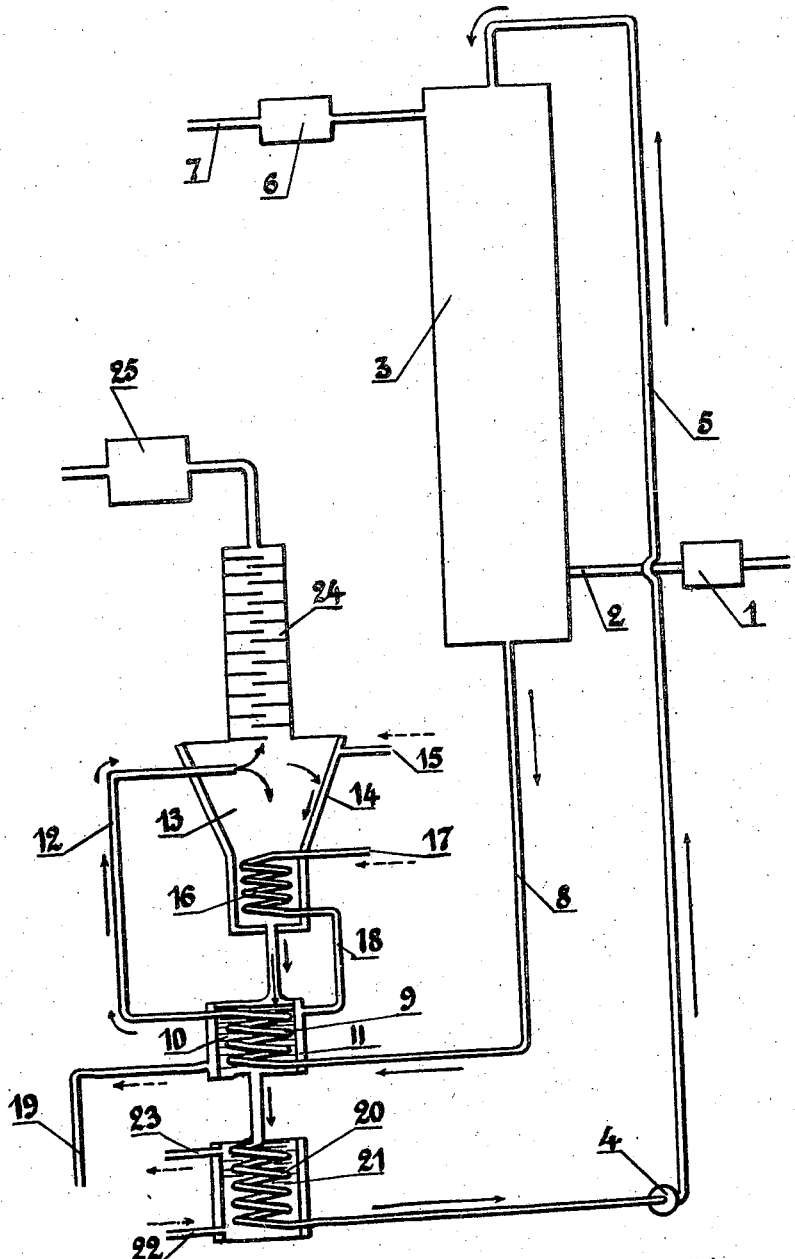

PAUL PASCAL, OF PARIS, FRANCE, ASSIGNOR TO LA MANUFACTURE DE PRODUITS CHIMIQUES DU NORD, ETABLISSEMENTS KUHLMANN, OF PARIS, FRANCE.

PROCESS AND APPARATUS FOR THE MANUFACTURE OF LIQUID SULFUROUS ACID FROM DILUTE SULFUROUS-ACID GAS.

1,398,791.    Specification of Letters Patent.    Patented Nov. 29, 1921.

Application filed January 9, 1920. Serial No. 350,303.

*To all whom it may concern:*

Be it known that I, PAUL PASCAL, a citizen of the French Republic, residing at No. 117 Boulevard Haussmann, Paris, France, have invented certain new and useful Improvements in Processes and Apparatus for the manufacture of Liquid Sulfurous Acid from Dilute Sulfurous-Acid Gas, of which the following is a specification.

Hitherto the processes of manufacture of liquid sulfurous acid from the dilute gases, for instance gases from furnaces roasting pyrites or blendes, are very costly, because the extraction of the sulfurous acid anhydrid entails a considerable consumption of energy and a large plant.

It has already been proposed to cause the above mentioned gases after cooling to pass through a suitable solvent which absorbs the sulfurous acid gas and then to liberate the gas from the solvent by heating, but the solvents employed are more or less unsatisfactory.

The improved process is based on the great solubility of sulfurous acid gas in non-anthracenic coal tar oils which, contrary to the majority of the other usual liquids, are capable of dissolving one-fourth of their weight at ordinary temperature when the sulfurous acid gas is at atmospheric pressure.

The improved process consists also in effecting the absorption of the compressed dilute gas and extracting the sulfurous acid from the solvent under expansion, which is possible owing to the slight volatility of coal tar oils. The absorption after pressure enables me to use an apparatus of much smaller volume.

The improved process consists in compressing the dilute gas, cooling it to the ordinary temperature and delivering it into a column filled with packing materials wherein the sulfurous acid gas comes into contact with coal tar oil of very low volatility, preferably having a density equal to 1, which absorbs the said gas in great quantity.

The sulfurous acid gas can then be separated by heating with expansion, for which purpose the saturated liquid is passed through a heat exchanger whence it passes into an expansion device that is likewise heated. In the latter device, under a reduced pressure, it loses almost the whole of the dissolved sulfurous acid gas which is then compressed for the purpose of liquefying same.

The organic liquid freed from the sulfurous acid gas is cooled, and then returned into the absorption column. The spent gas which has been previously washed therein, is delivered, if necessary after expansion or without same, into a suitable apparatus for recovering the last traces of the sulfurous acid.

An apparatus for carrying the improved process into effect is illustratd diagrammatically by way of example in the accompanying drawings.

The dilute gas is sent into a compressor 1 whence after compression it passes through a pipe 2 into the base of an absorption tower 3 filled with packing materials of large superficial area composed for instance of annular bodies. This tower must be maintained at as low a temperature as possible, and consequently in the summer time it may be necessary for it to be sprinkled on the outside. The heavy oil is delivered by the pump indicated diagrammatically at 4 through the pipe 5 to the top of the tower 3. A distributer (not shown) of any suitable current type distributes the said oil over the packing materials which are thus sprinkled therewith, the sulfurous acid gas being absorbed by the heavy oil, while the residue passes into the expander 6 whence it is conveyed through a pipe 7 into a suitable apparatus (not shown) wherein the last traces of sulfurous acid are retained.

The sulfurous acid solution collected at the base of the tower 3 is forced by the bottom pressure through a pipe 8 into a worm 9 situated in the center of a tank 10 that constitutes a temperature exchanger and is surrounded by a steam jacket 11. By the action of the heat the sulfurous acid solution is converted into an emulsion of gas in the residual liquid. The worm 9 extends in the form of a nozzle 12 which projects the emulsion tangentially to the surface of a separator consisting of a vessel 13 with a jacket 14, having the shape of a truncated cone with a cylindrical extension, the jacket space being traversed by steam supplied by the pipe 15.

The pressure inside this separator is maintained at a reduced amount by a suction pump hereinafter referred to. The solution spreads out in a thin sheet over the inside wall of the separator, and collects at the base in the cylindrical portion where it is further heated by a worm 16. This worm 16 is traversed by a current of steam supplied by the pipe 17, which steam passes from the outlet of the worm through the pipe 18 into the jacket space of the exchanger 10, whence it escapes through the pipe 19.

By the action of the heat and the expansion in the separator vessel 13, the liquid is separated from the gas it contains. The spent liquid passes into the exchanger 10 wherein it gives up a portion of its heat and is sucked away again by the pump 4 through a worm 20 contained in a vessel 21 cooled by a current of water supplied by the pipe 22; this water returning through the pipe 23 back into the circuit.

A plate column 24 is fixed on the upper part of the separator 13. 25 is a suction pump connected to the upper end of the column 24; it produces a great drop in the pressure in the separator 13 and sucks off the gas contained in the latter. The oil vapor carried along by the gas strikes the plates of the column 24 and is returned into the separator, whereas the pure sulfurous acid gas extracted from the heavy oil is carried off and compressed either in a gasholder or in the flasks in which it is liquefied.

It is to be noted that it is possible to recover a part of the energy consumed in compressing the liquids and the gases, by receiving the latter after their expansion into a piston cylinder or a turbine coupled to the corresponding compressing device.

What I claim is:—

1. In the process for the manufacture of liquid sulfurous acid from dilute gases and more particularly from the gas derived from pyrite furnaces, in which the gases are brought into contact at a low temperature with a solvent and the sulfur dioxid is separated from the said solvent by heating, the improvement which consists in the use as solvent of nonanthracenic heavy oil.

2. In the process for the manufacture of liquid sulfurous acid from dilute gases and more particularly from the gas derived from pyrite furnaces, in which the gases are brought into contact at a low temperature with a solvent and the sulfur dioxid is separated from the said solvent by heating, the improvement which consists in the use as solvent of non anthracenic heavy oil of a density equal to 1.

3. A process for the manufacture of liquid sulfurous acid from dilute gases and more particularly from the gas derived from pyrite furnaces, which consists in compressing the dilute gases, and then bringing them into contact with non anthracenic heavy oil, separating out the sulfurous acid gas by heating with expansion, and liquefying said separated gas by compression.

4. An apparatus for recovering $SO_2$ comprising a gas compresser, an absorption tower, suitable packing materials filling said absorption tower, an orifice in the lower part of said tower adapted for the entrance of the dilute gas, an orifice in the upper part of said tower adapted to admit heavy oil, a heat exchanger, an expansion device, a nozzle adapted to project the oil in a thin sheet tangentially to the inside surface of said expansion device, a plate column whereby in the gas is separated by impact from the oil vapors that it has carried over with it, and a pipe for returning the oil to the top of said absorption tower.

In testimony whereof I have signed my name to this specification.

PAUL PASCAL.